US012620403B2

(12) United States Patent
Mosayyebpour Kaskari et al.

(10) Patent No.: US 12,620,403 B2
(45) Date of Patent: May 5, 2026

(54) NEURAL NOISE REDUCTION WITH LINEAR AND NONLINEAR FILTERING FOR SINGLE-CHANNEL AUDIO SIGNALS

(71) Applicant: Synaptics Incorporated, San Jose, CA (US)

(72) Inventors: Saeed Mosayyebpour Kaskari, Irvine, CA (US); Gandhi Namani, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 291 days.

(21) Appl. No.: 18/310,818

(22) Filed: May 2, 2023

(65) Prior Publication Data

US 2024/0371389 A1 Nov. 7, 2024

(51) Int. Cl.
*G10L 21/0264* (2013.01)
*G10L 21/0232* (2013.01)
(Continued)

(52) U.S. Cl.
CPC ...... *G10L 21/0264* (2013.01); *G10L 21/0232* (2013.01); *G10L 21/034* (2013.01); (Continued)

(58) Field of Classification Search
CPC ............. G10L 21/0264; G10L 21/0232; G10L 21/034; G10L 21/0364; G10L 25/06; G10L 25/18; G10L 25/30; G10L 25/84
See application file for complete search history.

(56) References Cited

U.S. PATENT DOCUMENTS 5,638,487 A 6/1997 Chigier
7,343,283 B2 3/2008 Ashley et al.
(Continued)

FOREIGN PATENT DOCUMENTS

CN 111883171 A 11/2020
DE 102019112383 A1 12/2019
KR 20240030483 A 3/2024

OTHER PUBLICATIONS

International Search Report and Written Opinion from PCT Application No. PCT/US2024/027104, dated Aug. 20, 2024, pp. 1-10.
(Continued)

*Primary Examiner* — Richemond Dorvil
*Assistant Examiner* — Ethan Daniel Kim
(74) *Attorney, Agent, or Firm* — Paradice & Li LLP

(57) ABSTRACT

This disclosure provides methods, devices, and systems for audio signal processing. The present implementations more specifically relate to speech enhancement techniques that combine statistical signal processing with neural network inferencing. In some aspects, a speech enhancement system may include a linear filter, a deep neural network (DNN), and a nonlinear post-filter. The linear filter and the nonlinear post-filter are configured to suppress noise in audio signals using statistical signal processing techniques. More specifically, the linear filter denoises an input audio signal based on a temporal correlation between successive frames of the audio signal. The DNN infers a speech signal and a noise signal (representing a speech component and a noise component, respectively, of the audio signal) based on the denoised audio signal. The nonlinear post-filter suppresses residual noise in the speech signal based on one or more Gaussian mixture models (GMM) associated with the speech signal and the noise signal.

20 Claims, 5 Drawing Sheets

(51) Int. Cl.
*G10L 21/034* (2013.01)
*G10L 21/0364* (2013.01)
*G10L 25/06* (2013.01)
*G10L 25/18* (2013.01)
*G10L 25/30* (2013.01)
*G10L 25/84* (2013.01)

(52) U.S. Cl.
CPC .......... *G10L 21/0364* (2013.01); *G10L 25/06* (2013.01); *G10L 25/18* (2013.01); *G10L 25/30* (2013.01); *G10L 25/84* (2013.01)

(56) References Cited

U.S. PATENT DOCUMENTS

| | | | |
|---|---|---|---|
| 2018/0182411 | A1 | 6/2018 | Kaskari et al. |
| 2018/0308503 | A1 | 10/2018 | Kaskari et al. |
| 2019/0130161 | A1 | 5/2019 | Chang et al. |
| 2019/0172476 | A1 | 6/2019 | Wung et al. |
| 2019/0385630 | A1* | 12/2019 | Sivaraman ............. G06N 3/048 |
| 2021/0125622 | A1 | 4/2021 | Zhao |
| 2022/0013123 | A1* | 1/2022 | Xu ........................... G10L 15/25 |
| 2022/0122597 | A1* | 4/2022 | Ji ......................... G10L 21/0232 |
| 2023/0074658 | A1 | 3/2023 | Sereshki et al. |
| 2023/0090763 | A1 | 3/2023 | Ozturk et al. |

OTHER PUBLICATIONS

Athineos et al., “Frequency-Domain Linear Prediction for Temporal Features,” in Proc. IEEE ASRU Workshop, pp. 261-266, Dec. 2003.
Graf et al., “Features for Voice Activity Detection: A Comparative Analysis,” EURASIP Journal on Advances in Signal Processing, pp. 1-15, (2015) 2015:91.
Nesta et al., “On-line Multi-Channel Estimation of Source Spectral Dominance,” in International Conference on Latent Variable Analysis and Signal Separation. Springer, pp. 404-412, 2015.
Shen et al. “Voice Activity Detection Based on Sequential Gaussian Mixture Model with Maximum Likelihood Criterion” IEEE, International Symposium on Chinese Spoken Language Processing (ISCSLP), pp. 1-5, Oct. 2016.
Tashev et al., “Unified Framework for Single Channel Speech Enhancement,” IEEE Pacific Rim Conference on Communications, Computers and Signal Processing, 6 pages, Aug. 2009.
U.S. Appl. No. 18/155,674, filed Jan. 17, 2023, entitled “Multi-Pass Neural Network for Speech Enhancement”, pp. 1-38.
U.S. Appl. No. 18/160,278, filed Jan. 26, 2023, entitled “Neural Temporal Beamformer for Noise Reduction in Single-Channel Audio Signals,” 38 pgs.
Wang et al, “Sequential Multi-frame Neural Beamforming for Speech Separation and Enhancement,” 2021 IEEE Spoken Language Technology Workshop (SLT), 2021, pp. 905-911, 2021.
Zhang et al., “Multi-Channel Multi-Frame ADL-MVDR for Target Speech Separation,” 12 pages, arXiv:2012.13442v1 [eess.AS] Dec. 24, 2020.
Q. tao, D. hao, Y. yong, Z. yifei, Y. changmao and L. yuxuan, “Speech recognition based on denoising self coding neural network,” 2020 International Conference on Big Data, Artificial Intelligence and Internet of Things Engineering (ICBAIE), Fuzhou, China, 2020, pp. 327-333, doi: 10.1109/ICBAIE49996. (Year: 2020).
Tammen et al., (“DNN-Based Speech Presence Probability Estimation for Multi-Frame Single-Microphone Speech Enhancement,” ICASSP 2020—2020 IEEE International Conference on Acoustics, Speech and Signal Processing (ICASSP), Barcelona, Spain, 2020) (Year: 2020).
Tammen et al., (“Deep multi-frame MVDR filtering for single-microphone speech enhancement.” ICASSP 2021-2021 IEEE International Conference on Acoustics, Speech and Signal Processing (ICASSP). IEEE, 2021) (Year: 2021).
Zhou et al. (“A robust dual-microphone generalized sidelobe canceller using a bone-conduction sensor for speech enhancement.” Sensors 21.5 (2021)) (Year: 2021).

* cited by examiner

NEURAL NOISE REDUCTION WITH LINEAR AND NONLINEAR FILTERING FOR SINGLE-CHANNEL AUDIO SIGNALS

TECHNICAL FIELD

The present implementations relate generally to signal processing, and specifically to neural noise reduction techniques with linear and nonlinear filtering for single-channel audio signals.

BACKGROUND OF RELATED ART

Many hands-free communication devices include microphones configured to convert sound waves into audio signals that can be transmitted, over a communications channel, to a receiving device. The audio signals often include a speech component (such as from a user of the communication device) and a noise component (such as from a reverberant enclosure). Speech enhancement is a signal processing technique that attempts to suppress the noise component of the received audio signals without distorting the speech component. Many existing speech enhancement techniques rely on statistical signal processing algorithms that continuously track the pattern of noise in each frame of the audio signal to model a spectral suppression gain or filter that can be applied to the received audio signal in a time-frequency domain.

Some modern speech enhancement techniques implement machine learning to model a spectral suppression gain or filter that can be applied to the received audio signal in a time-frequency domain. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that the final output of the neural network results in a desired inference. The set of transformations associated with the various layers of the network is referred to as a "neural network model."

The size of a neural network (such as the number of layers in the neural network or the number of neurons in each layer) generally affects the accuracy of the inferencing result. More specifically, larger neural networks tend to produce more accurate inferences than smaller or more compact neural networks. However, speech enhancement for single-channel audio is often implemented by low power edge devices with very limited resources (such as battery-powered headsets, earbuds, and other hands-free communication devices with a single microphone input). As such, many existing single channel speech enhancement techniques rely on compact neural network architectures that produce filtered audio signals with some amount of speech distortion or noise leakage (also referred to as "residual noise"). Thus, there is a need to improve the quality of speech in single-channel audio signals.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes steps of receiving a series of frames of an audio signal; denoising a first frame in the series of frames based at least in part on a temporal correlation between the series of frames; inferring a probability of speech associated with the denoised first frame based on a neural network model; generating a first speech signal and a first noise signal based on the probability of speech associated with the denoised first frame, where the first speech signal and the first noise signal represent a speech component and a noise component, respectively, of the audio signal in the first frame; determining a first spectral suppression gain based on the first speech signal and the first noise signal; and suppressing residual noise in the first speech signal based on the first spectral suppression gain.

Another innovative aspect of the subject matter of this disclosure can be implemented in a speech enhancement system, including a processing system and a memory. The memory stores instructions that, when executed by the processing system, cause the speech enhancement system to receive a series of frames of an audio signal; denoise a first frame in the series of frames based at least in part on a temporal correlation between the series of frames; infer a probability of speech associated with the denoised first frame based on a neural network model; generate a first speech signal and a first noise signal based on the probability of speech associated with the denoised first frame, where the first speech signal and the first noise signal represent a speech component and a noise component, respectively, of the audio signal in the first frame; determine a first spectral suppression gain based on the first speech signal and the first noise signal; and suppress residual noise in the first speech signal based on the first spectral suppression gain.

BRIEF DESCRIPTION OF THE DRAWINGS

The present implementations are illustrated by way of example and are not intended to be limited by the figures of the accompanying drawings.

DETAILED DESCRIPTION

Figure 1:
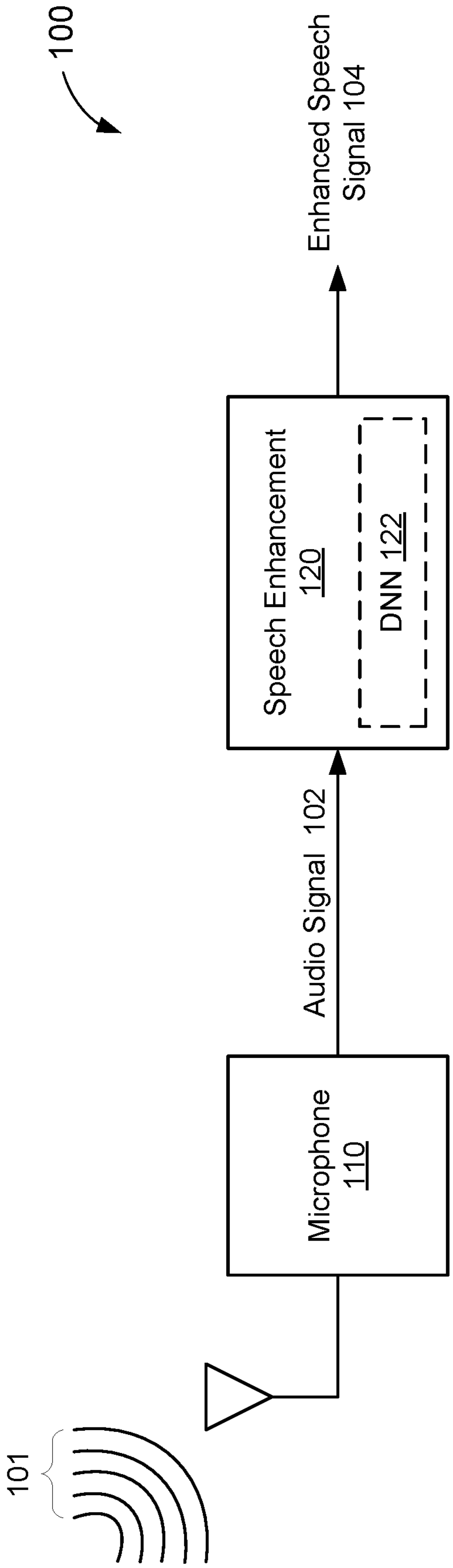
FIG. 1 shows an example audio receiver that supports single channel speech enhancement.

In the following description, numerous specific details are set forth such as examples of specific components, circuits, and processes to provide a thorough understanding of the present disclosure. The term “coupled” as used herein means connected directly to or connected through one or more intervening components or circuits. The terms “electronic system” and “electronic device” may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as “accessing,” “receiving,” “sending,” “using,” “selecting,” “determining,” “normalizing,” “multiplying,” “averaging,” “monitoring,” “comparing,” “applying,” “updating,” “measuring,” “deriving” or the like, refer to the actions and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term “processor,” as used herein may refer to any general-purpose processor, special-purpose processor, conventional processor, controller, microcontroller, and/or state machine capable of executing scripts or instructions of one or more software programs stored in memory.

As described above, some modern speech enhancement techniques utilize neural networks to model a spectral suppression gain or filter that can be applied to an audio signal in the time-frequency domain. Generally, larger neural networks tend to produce more accurate inferences than smaller or more compact neural networks. However, speech enhancement for single-channel audio is often implemented by low power edge devices with limited resources (such as battery-powered headsets, earbuds, and other hands-free communication devices with a single microphone input). As such, many existing single channel speech enhancement techniques rely on compact neural network architectures that produce filtered audio signals with some amount of speech distortion or noise leakage (also referred to as “residual noise”). Aspects of the present disclosure recognize that statistical signal processing techniques can be combined with neural network inferencing to further improve the quality of speech in single-channel audio signals.

Various aspects relate generally to audio signal processing, and more particularly, to speech enhancement techniques that combine statistical signal processing with neural network inferencing. In some aspects, a speech enhancement system may include a linear filter, a deep neural network (DNN), and a nonlinear post-filter. The linear filter and the nonlinear post-filter are configured to suppress noise in audio signals using statistical signal processing techniques.

More specifically, the linear filter denoises an input audio signal based on a temporal correlation between successive frames of the audio signal. The DNN infers a probability of speech in the denoised audio signal and produces a speech signal and a noise signal (representing a speech component and a noise component, respectively, of the audio signal) based on the inferred probability of speech. In some implementations, the probability of speech also may be used to update various parameters of the linear filter (such as a vector of weights associated with a multi-frame beamformer). The nonlinear post-filter suppresses residual noise in the speech signal based on a Gaussian mixture model (GMM) associated with the speech signal and the noise signal.

Particular implementations of the subject matter described in this disclosure can be implemented to realize one or more of the following potential advantages. By combining statistical signal processing with neural network inferencing, aspects of the present disclosure can significantly improve the speech quality of hands-free communication devices. More specifically, the linear filter preconditions audio signals to have reduced noise prior to being input to the DNN while the nonlinear post-filter further suppresses residual noise in the audio signals output by the DNN. Accordingly, the speech enhancement system of the present implementations may use a relatively compact neural network to achieve inferencing results similar to much larger neural networks. Because statistical signal processing techniques require relatively low overhead (compared to larger neural networks), the speech enhancement systems of the present implementations may be well-suited for implementation in low power edge devices with very limited resources.

FIG. 1 shows an example audio receiver 100 that supports single channel speech enhancement. The audio receiver 100 includes a microphone 110 and a speech enhancement component 120. The microphone 110 is configured to convert sound waves 101 (also referred to as "acoustic waves") into an audio signal 102. Thus, the audio signal 102 is an electrical signal representative of the acoustic waveform. In some aspects, the microphone 110 may be associated with a single audio channel. Thus, the audio signal 102 also may be referred to as a "single-channel" audio signal.

In some implementations, the sound waves 101 may include user speech mixed with background noise or interference (such as reverberant noise from a headset enclosure). Thus, the audio signal 102 may include a speech component and a noise component. For example, the audio signal 102 (X(l,k)) can be expressed as a combination of the speech component (S(l,k)) and the noise component (N(l,k)), where l is a frame index and k is a frequency index associated with a time-frequency domain:

$$X(l, k) = S(l, k) + N(l, k) \tag{1}$$

The speech enhancement component 120 is configured to improve the quality of speech in the audio signal 102, for example, by suppressing the noise component N(l,k) or otherwise increasing the signal-to-noise ratio (SNR) of the audio signal 102. In some implementations, the speech enhancement component 120 may apply a spectral suppression gain or filter to the audio signal 102. The spectral suppression gain attenuates the power of the noise component N(l,k) of the audio signal 102, in the time-frequency domain, to produce an enhanced speech signal 104. As a result, the enhanced speech signal 104 may have a higher SNR than the audio signal 102.

In some aspects, the speech enhancement component 120 may determine a spectral suppression gain based, at least in part, on a deep neural network (DNN) 122. For example, the DNN 122 may be trained to infer a likelihood or probability of speech in audio signals. Example suitable DNNs include, among other examples, convolutional neural networks (CNNs) and recurrent neural networks (RNNs). During a training phase, the DNN 122 may be provided with a large volume of audio signals containing speech mixed with background noise (also referred to as "noisy speech" signals). The DNN 122 also may be provided with clean speech signals representing only the speech component of each audio signal (without the background noise). The DNN 122 compares the noisy speech signals with the clean speech signals to determine a set of features that can be used to classify speech.

During an inferencing phase, the DNN 122 may determine a probability of speech ($p_{DNN}(l,k)$) in each frame l of the audio signal 102, at each frequency index k associated with the time-frequency domain, based on the classification results. In some implementations, the DNN 122 may further convert the probability of speech $p_{DNN}(l,k)$ into a spectral suppression gain ($G_{DNN}(l,k)$) that can be used to produce an enhanced speech signal (Z(l,k)), where $Z(l,k)=G_{DNN}(l,k)X(l,k)$. More specifically, the spectral suppression gain $G_{DNN}(l,k)$ may suppress the noise component N(l,k) of the audio signal 102 in the $l^{th}$ audio frame. For example, if there is a low probability of speech in the $L^{th}$ frame of the audio signal 102 at the Kth frequency index (indicating that noise is dominant at this time-frequency index), the value of $G_{DNN}(L,K)$ may be relatively low so that the power of N(L,K) is attenuated when applying the spectral suppression gain to the audio signal 102.

As described above, the size of a neural network (such as the number of layers in the neural network or the number of neurons in each layer) generally affects the accuracy of the inferencing result. More specifically, larger neural networks tend to produce more accurate inferences than smaller or more compact neural networks. As such, existing neural network architectures require significant processing power and memory to achieve accurate speech enhancement, particularly for single-channel audio signals. However, single channel speech enhancement is often used in low power edge devices with limited resources (such as battery-powered headsets, earbuds, and other hands-free communication devices with a single microphone input). As such, compact neural networks may be more suitable than larger neural networks for many single channel speech enhancement applications.

In some implementations, the DNN 122 may be a relatively compact neural network. As a result, the DNN 122 may not filter at least some of the noise in the audio signal 102. In other words, the DNN 122 may produce an enhanced speech signal Z(l,k) having some speech distortion or residual noise. Aspects of the present disclosure recognize that statistical signal processing techniques can be combined with neural network inferencing to further improve the quality of speech in single-channel audio signals. Example suitable statistical processing techniques include, among other examples, linear and nonlinear filtering techniques. In some aspects, the speech enhancement component 120 may perform linear filtering on the input of the DNN 122 to suppress noise in the audio signal 102 prior to being processed by the DNN 122. In some other aspects, the speech enhancement component 120 may perform nonlinear filtering on the output of the DNN 122 to further suppress residual noise in the enhanced speech signal 104.

Figure 2:
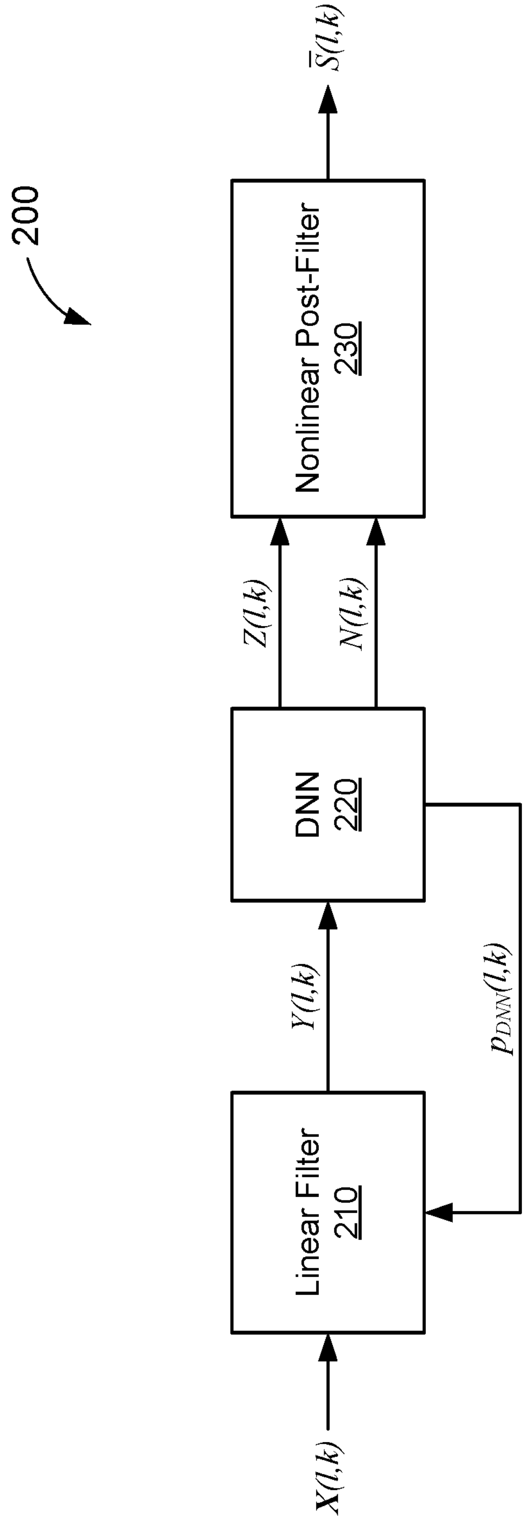
FIG. 2 shows a block diagram of an example speech enhancement system, according to some implementations.

FIG. 2 shows a block diagram of an example speech enhancement system 200, according to some implementations. In some implementations, the speech enhancement system 200 may be one example of the speech enhancement component 120 of FIG. 1. More specifically, the speech enhancement system 200 may receive a series of frames (X(l,k)) of an input audio signal and produce a corresponding frame (S(l,k)) of an enhanced audio signal by filtering or suppressing noise in the audio signal. With reference for example to FIG. 1, the input audio signal may be one example of the single-channel audio signal 102 and the enhanced audio signal may be one example of the enhanced speech signal 104.

The series of input audio frames X(l,k) includes the current audio frame to be processed ($X_0$(l,k)), a number (c) of future audio frames ($X^{future}$(l,k)) that follow the current audio frame $X_0$(l,k) in time, and a number (d) of past audio frames ($X^{past}$(l,k)) that precede the current audio frame $X_0$(l,k) in time, such that:

$$X(l,k) = \left[X_0(l,k), X^{future}(l,k), X^{past}(l,k)\right]$$

$$X^{future}(l,k) = [X_{+\Delta}(l,k), X_{+2\Delta}(l,k), \ldots, X_{+c\Delta}(l,k)]$$

$$X^{past}(l,k) = [X_{-\Delta}(l,k), X_{-2\Delta}(l,k), \ldots, X_{-d\Delta}(l,k)]$$

where c+d≥1 and Δ is a delay parameter that determines a delay between successive frames in the series of input audio frames X(l,k). In some implementations, the delay parameter Δ may be set to a value less than a frame hop associated with the speech enhancement system 200 (such as 1 sample) to ensure temporal speech correlation across the input audio frames X(l,k).

For example, given a fast Fourier transform (FFT) size of K (where K is the number of frequency bins associated with the FFT), the current audio frame $X_0$(l,k) can be expressed as:

$$FFT(x[n], x[n+1], \ldots, x[n+K-1]) = [X(l,0), X(l,1), \ldots, X(l,K-1)] \equiv X_0(l,k)$$

and the past audio frames $X^{past}$(l,k) can be expressed as:

$$FFT(x[n-\Delta], x[n-\Delta+1], \ldots, x[n-\Delta+K-1]) \equiv X_{-\Delta}(l,k)$$

$$FFT(x[n-d\Delta], x[n-d\Delta+1], \ldots, x[n-d\Delta+K-1]) \equiv X_{-d\Delta}(l,k)$$

and the future audio frames $X^{future}$(l,k) can be expressed as:

$$FFT(x[n+\Delta], x[n+\Delta+1], \ldots, x[n+\Delta+K-1]) \equiv X_{+\Delta}(l,k)$$

$$FFT(x[n+c\Delta], x[n+c\Delta+1], \ldots, x[n+c\Delta+K-1]) \equiv X_{+c\Delta}(l,k)$$

In some implementations, the speech enhancement system 220 may include a linear filter 210, DNN 220, and a nonlinear post-filter 230. The linear filter 210 is configured to produce a denoised audio frame Y(l,k) based on the series of input audio frames X(l,k). More specifically, the linear filter 210 may suppress or attenuate a noise component (N(l,k)) of the current audio frame $X_0$(l,k) based on a temporal correlation associated with the series of input audio frames X(l,k). In some implementations, the linear filter 210 may include a multi-frame beamformer. Example suitable multi-frame beamformers include, but are not limited to, multi-frame minimum variance distortionless response (MF-MVDR) beamformers.

Multi-frame beamformers exploit the temporal characteristics of single-channel audio signals to enhance speech. More specifically, multi-frame beamforming relies on accurate predictions or estimations of the temporal correlation of speech between consecutive audio frames (also referred to as the "interframe correlation of speech"). With reference for example to Equation 1, the speech component S(l,k) of an audio signal can be decomposed into a correlated part (a(l,k) s (l,k)) and an uncorrelated part (s'(l,k)):

$$S(l,k) = a(l,k)s(l,k) + s'(l,k)$$

$$a(l,k) = \frac{\Phi_{SS}(l,k)e}{E[|s(l,k)|^2]} = \frac{\Phi_{SS}(l,k)e}{e^T\Phi_{SS}(l,k)e}$$

where a(l,k) is an interframe correlation (IFC) vector associated with the speech component of the audio frames X(l,k), $\Phi_{SS}$(l,k) is a matrix representing the covariance of the speech component, and e is a vector selecting the first column of $\Phi_{SS}$(l,k). Accordingly, the multi-frame signal model can be expressed as:

$$X(l,k) = a(l,k)s(l,k) + s'(l,k) + N(l,k)$$

where the uncorrelated speech component s'(l,k) is treated as interference.

A multi-frame beamformer may use the IFC vector a(l,k) to align the series of input frames X(l,k), for example, so that the speech component S(l,k) combines in a constructive manner (or the noise component N(l,k) combines in a destructive manner) when the input frames X(l,k) are summed together. For example, an MF-MVDR beamformer may apply a vector of weights $w=[w_0, \ldots, w_Q]^T$ to the series of audio frames X(l,k) to produce the denoised audio frame Y(l,k):

$$Y(l,k) = w^H(l,k)X(l,k)$$

In some aspects, the linear filter 210 may determine a vector of weights w(l,k) that optimizes the denoised audio frame Y(l,k) with respect to one or more conditions. For example, the linear filter 210 may determine a vector of weights w(l,k) that reduces or minimizes the variance of the noise component of the audio frame Y(l,k) without distorting the speech component of the audio frame Y(l,k). In other words, the vector of weights w(l,k) may satisfy the following condition:

$$\text{argmin}_w w(l,k)\Phi_{NN}(l,k)w(l,k) \text{ s.t. } w^H(l,k)a(l,k) = 1$$

where $\Phi_{NN}$(l,k) is a matrix representing the covariance of the noise component of the audio frames X(l,k). The resulting vector of weights w(l,k) represents an MF-MVDR beamforming filter ($w_{MVDR}$(l,k)), which can be expressed as:

$$w_{MVDR}(l,k)=\frac{\phi_{NN}^{-1}(l,k)a(l,k)}{a^{H}(l,k)\phi_{NN}^{-1}(l,k)a(l,k)} \tag{2}$$

In some implementations, the linear filter 210 may estimate or track the IFC vector a(l,k) and the noise covariance matrix $\Phi_{NN}$(l,k), over time, as a function of X(l,k)$X^H$(l,k). More specifically, the linear filter 210 may update the IFC vector a(l,k) when speech is present or otherwise detect in the input audio signal and may refrain from updating the IFC vector a(l,k) when speech is absent or otherwise not detected in the input audio signal. On the other hand, the linear filter 210 may update the noise covariance matrix $\Phi_{NN}$(l,k) when speech is absent or otherwise not detected in the input audio signal and may refrain from updating the noise covariance matrix $\Phi_{NN}$(l,k) when speech is present or otherwise detected in the input audio signal.

The DNN 220 is configured to infer a probability of speech $p_{DNN}$(l,k) in the current audio frame $X_0$(l,k) based on a neural network model, where 0≤$p_{DNN}$(l,k)≤1. In some implementations, the DNN 220 may be one example of the DNN 122 of FIG. 1. In some aspects, the linear filter 210 may update the IFC vector a(l,k) or the noise covariance matrix $\Phi_{NN}$(l,k) based, at least in part, on the probability of speech $p_{DNN}$(l,k) inferred by the DNN 220. For example, the linear filter 210 may determine whether speech is present or absent in the audio signal (also referred to as voice activity detection (VAD)), and thus whether to update the IFC vector a(l,k) or the noise covariance matrix $\Phi_{NN}$(l,k), based on the probability of speech $p_{DNN}$(l,k). Accordingly, the linear filter 210 may determine the vector of weights w MVDR(l,k) to be applied to the current audio frame $X_0$(l,k) based on the probability of speech in the previous audio frame $p_{DNN}^{(l-1,k)}$.

In some aspects, the DNN 220 may further produce a speech signal (Z(l,k)) and a noise signal (N(l,k)) based on the probability of speech $p_{DNN}$(l,k), where the speech signal Z(l,k) represents a speech component of the denoised audio frame Y(l,k) and the noise signal N(l,k) represents a noise component of the denoised audio frame Y(l,k). For example, the DNN 220 may compute a spectral suppression gain ($G_{DNN}$(l,k)) based on the probability of speech $p_{DNN}$(l,k) and may apply the spectral suppression gain $G_{DNN}$(l,k) to the denoised audio frame Y(l,k) to produce the speech signal Z(l,k), where Z(l,k)=$G_{DNN}$(l,k) Y(l,k). The noise signal N(l,k) may be computed as a difference between the denoised audio frame Y(l,k) and the speech signal Z(l,k), where N(l,k)=Y(l,k)−Z(l,k)

In some aspects, the DNN 220 may be biased towards minimizing speech distortion, rather than maximizing noise suppression. In other words, the spectral suppression gain $G_{DNN}$(l,k) may be tuned to ensure that the speech component of the denoised audio frame Y(l,k) is not distorted in the resulting speech signal Z(l,k). For example, the DNN 220 may calculate the speech signal Z(l,k) as a function of the denoised audio frame Y(l,k), the probability of speech $p_{DNN}$(l,k), and a tuning parameter (σ) that controls the amount of noise reduction by the DNN 220:

$$|Z(l,k)|=\min(p_{DNN}(l,k)+\sigma,1)|Y(l,k)|$$

-continued $$\text{phase}(Z(l,k))=\text{phase}(Y(l,k))$$

where |Z(l,k)| is the magnitude of the speech signal Z(l,k), phase (Z(l,k)) is the phase of the speech signal Z(l,k), and 0≤σ<1. In some implementations, the tuning parameter σ may be configured so that the speech signal Z(l,k) contains no speech distortion (and may thus contain some residual noise).

In the example of FIG. 2, the neural network model is trained to infer a probability of speech $p_{DNN}$(l,k). In some other implementations, the neural network model may be trained to infer the speech component Ž(l,k) of the denoised audio frame Y(l,k). In such implementations, the probability of speech $p_{DNN}$(l,k) and the speech signal Z(l,k) may be computed as a function of the denoised audio frame Y(l,k) and the inferred speech component Ž(l,k):

$$p_{DNN}(l,k)=\frac{|\tilde{Z}(l,k)|}{|Y(l,k)|}$$

$$Z(l,k)=\tilde{Z}(l,k)+\sigma|Y(l,k)|$$

The nonlinear post-filter 230 is configured to produce the enhanced audio frame $\overline{S}$(l,k) based on the speech signal Z(l,k) and the noise signal N(l,k). More specifically, the nonlinear post-filter 230 may attenuate the residual noise in the speech signal Z(l,k) based on one or more voice activity detection (VAD) features associated with the speech signal Z(l,k) and the noise signal N(l,k). As used herein, the term "VAD feature" refers to any characteristics of the speech signal Z(l,k), the noise signal N(l,k), or any combination thereof, that reflects the presence of speech in the current audio frame $X_0$(l,k). In some implementations, the one or more VAD features may include a normalized difference (e (l,k)) between the speech signal Z(l,k) and the noise signal N(l,k).

Aspects of the present disclosure recognize that the speech signal Z(l,k) contains mostly target speech and the noise signal N(l,k) contains mostly background noise. As such, the normalized difference e (l,k) between the signals Z(l,k) and N(l,k) may be closer to +1 when the target speech is present in the speech signal Z(l,k) and closer to −1 when the target speech is absent from the speech signal Z(l,k):

$$e(l,k)=\frac{Z(l,k)-N(l,k)}{Z(l,k)+N(l,k)} \tag{3}$$

In some implementations, the nonlinear post-filter 320 may use an online Gaussian mixture model (GMM) to determine a probability of speech ($p_{GMM}$(l,k)) associated with the speech signal Z(l,k) based on the normalized difference e (l,k) between the speech signal Z(l,k) and the noise signal N(l,k). For example, the normalized difference e (l,k) can be used to create a bimodal model with two Gaussian probability density functions (PDFs), including a Gaussian PDF for which the target speech is dominant and a Gaussian PDF for which the noise is dominant. The online GMM can be used to calculate a weight ($w_c$), mean ($\mu_c$), and variance ($\sigma_c$) for each Gaussian PDF, where c=1 represents the Gaussian PDF for which target speech is dominant and c=2 represents the Gaussian PDF for which noise is dominant:

$$w_c(l,k) = (1-\eta_c)w_c(l-1,k) + \eta_c p_c[c|e(l,k), \lambda(l-1,k)] \quad (4)$$

$$\mu_c(l,k) = \frac{(1-\eta_c)\mu_c(l-1,k) + \eta_c p_c[c|e(l,k), \lambda(l-1,k)]e(l,k)}{w_c(l,k)}$$

$$\sigma_c(l,k) = \frac{(1-\eta_c)\sigma_c(l-1,k) + \eta_c p_c[c|e(l,k), \lambda(l-1,k)](e(l,k)-\mu_c(l,k))^2}{w_c(l,k)}$$

$$p_c[c|e(l,k), \lambda(l,k)] = \frac{w_c(l,k)p[e(l,k)|c, \lambda(l,k)]}{\sum_{c=1}^{2} w_c(l,k)p[e(l,k)|c, \lambda(l,k)]}$$

$$p[e(l,k)|c, \lambda(l,k)] = \frac{1}{\sigma_c(l,k)\sqrt{2\pi}} e^{-\frac{1}{2}\left(\frac{e(l,k)-\mu_c(l,k)}{\sigma_c(l,k)}\right)^2}$$

$$p_{GMM}(l,k) = p_{c=1}[c=1|e(l,k), \lambda(l,k)]$$

where $p_{GMM}(l,k)$ is a soft probability of speech at each time-frequency index, $\lambda(l,k)=\{w_1(l,k), \mu_1(l,k), \sigma 1(l,k), w_2(l,k), \mu_2(l,k), \sigma_2(l,k)\}$, and $\eta_c$ is a learning rate step size.

In some implementations, the step size $\eta_c$ can be adaptively determined based on the denoised audio frame Y(l,k) and the probability of speech $p_{DNN}(l,k)$ inferred by the DNN 220:

$$VAD_{DNN}(l) = \frac{\sum_{k=k_{min}}^{k_{max}} Y(l,k)p_{DNN}(l,k)}{\sum_{k=k_{min}}^{k_{max}} Y(l,k)}$$

$$\eta_1 = \eta VAD_{DNN}(l)$$

$$\eta_2 = \eta(1 - VAD_{DNN}(l))$$

where $\eta$ is a maximum step size that can be used for sub-band parameter tracking (and may be a tunable hyper-parameter associated with the speech enhancement system 200), and $k_{min}$ to $k_{max}$ represents a frequency range for which speech is dominant (such as 0-2 kHz).

In some implementations, a VAD based on multi-frame temporal processing ($VAD_t(l)$) can be expressed as a function of the current audio frame $X_0(l,k)$ and the denoised audio frame Y(l,k):

$$p_t(l,k) = \frac{Y(l,k)}{X_0(l,k)}$$

$$VAD_t(l) = \frac{\sum_{k=k_{min}}^{k_{max}} X_0(l,k)p_t(l,k)}{\sum_{k=k_{min}}^{k_{max}} X_0(l,k)}$$

$$VAD_{update}(l) = \begin{cases} 1 & \text{if } VAD_t(l) > c_1 \text{ and } VAD_{DNN}(l) > c_2 \\ 0 & \text{if } VAD_t(l) < c_3 \text{ and } VAD_{DNN}(l) < c_4 \\ -1 & \text{otherwise} \end{cases}$$

where $c_1$, $c_2$, $c_3$, and $c_4$ are tuning thresholds (between 0 and 1). In some implementations, $VAD_{update}(l)$ may be used to indicate which sets of GMM parameters (such as for speech or noise) should be updated:

$$VAD_{update}(l) = \begin{cases} 1 & \text{update } w_1(l,k), \mu_1(l,k), \sigma_1(l,k) \\ 0 & \text{update } w_2(l,k), \mu_2(l,k), \sigma_2(l,k) \end{cases}$$

In some implementations, the nonlinear post-filter 230 may estimate the magnitude (or power) of noise ($p_n(l,k)$) in the speech signal Z(l,k) based on the probability of speech $p_{GMM}(l,k)$ and, using spectral subtraction, determine a spectral suppression gain ($G_{GMM}(l,k)$) that can be applied to the speech signal Z(l,k) to produce the enhanced audio frame S(l,k):

$$P_n(l,k) = p_{GMM}(l,k)P_n(l-1,k) + (1-p_{GMM}(l,k))|Z(l,f)| \quad (5)$$

$$G_{GMM}(l,k) = \max\left(\frac{\max(|Z(l,k)| - P_n(l,k), 0)}{|Z(l,k)|}, g\right) \quad (6)$$

$$\overline{S}(l,k) = G_{GMM}(l,k)Z(l,k)$$

where g is a tuning parameter which represents a floor gain associated with the spectral subtraction.

Aspects of the present disclosure recognize that multiple VAD features (including the normalized difference e (l,k) between the speech signal Z(l,k) and the noise signal N(l,k)) can be combined to produce a spectral suppression gain $G_{GMM}(l,k)$ that is more robust to different noisy environments. Other example suitable VAD features may include a cepstral peak, a spectral entropy, and a harmonic product spectrum (HPS) of the speech signal Z(l,k), among other examples. In some implementations, the nonlinear post-filter 230 may determine a respective probability of speech $$(p^i_{GMM}(l,k))$$

associated with each VAD feature ($e^i(l,k)$), where i≥1, and calculate the spectral suppression gain $G_{GMM}(l,k)$ based on the lowest probability among the probabilities of speech $$p^i_{GMM}(l,k)$$

associated with any of the VAD features $e^i(l,k)$.

Figure 3:
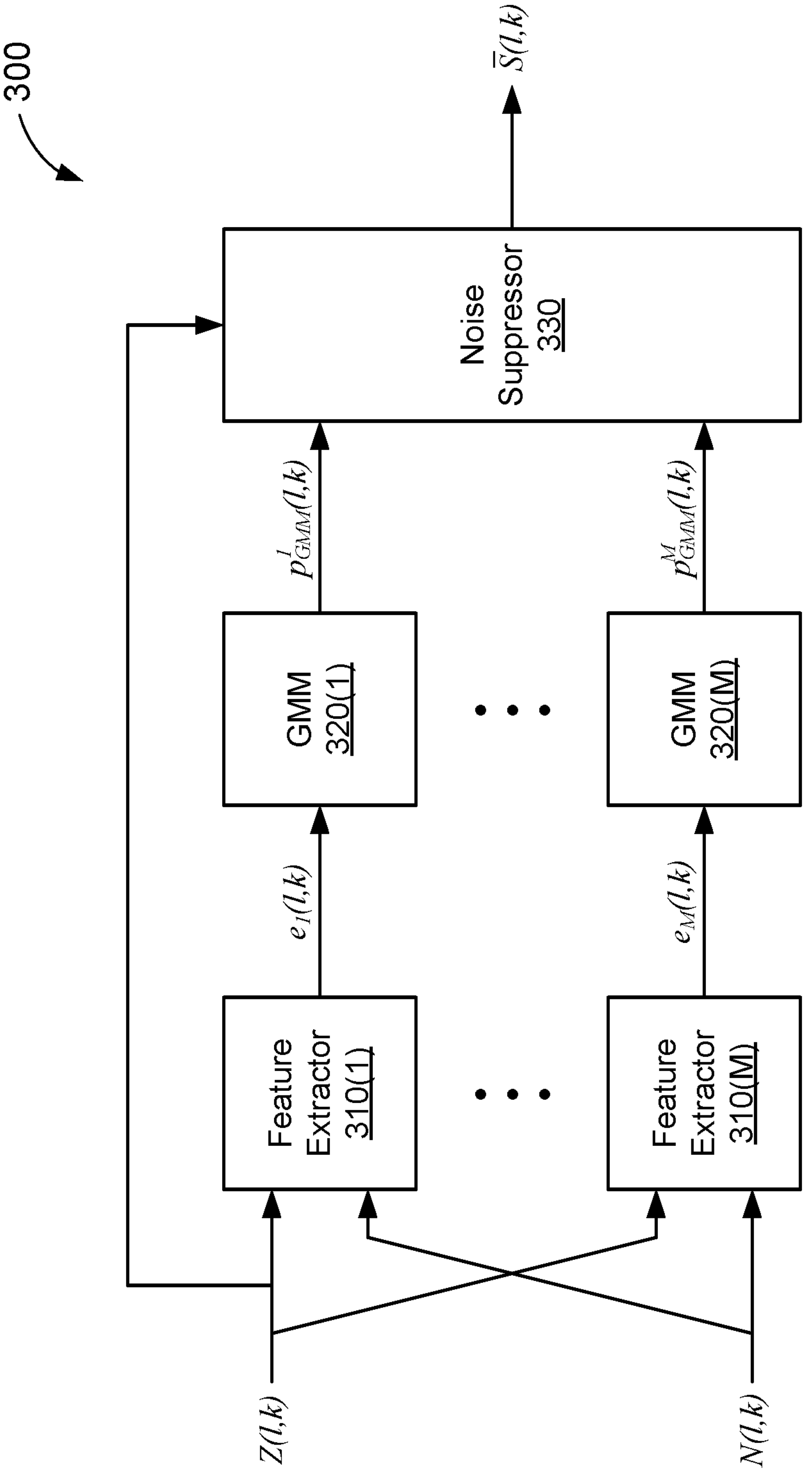
FIG. 3 shows a block diagram of an example nonlinear filter for single-channel audio signals, according to some implementations.

FIG. 3 shows a block diagram of an example nonlinear filter 300 for single-channel audio signals, according to some implementations. In some implementations, the nonlinear filter 300 may be one example of the nonlinear filter 230 of FIG. 2. More specifically, the nonlinear filter 300 may produce an enhanced audio frame $\overline{S}(l,k)$ based on a speech signal Z(l,k) and a noise signal N(l,k). As described with reference to FIG. 2, the speech signal Z(l,k) and the noise signal N(l,k) may represent a speech component and a noise component, respectively, of an audio frame Y(l,k), where Z(l,k)+N(l,k)=Y (l,k). In some implementations, the signals Z(l,k) and N(l,k) may be inferred or otherwise produced by a neural network (such as the DNN 220 of FIG. 2).

In some aspects, the nonlinear filter 300 may suppress residual noise in the speech signal Z(l,k) based on a number (M) of VAD features associated with the speech signal Z(l,k) and the noise signal N(l,k). In some implementations, the nonlinear filter 300 may suppress the residual noise in the speech signal Z(l,k) based on multiple VAD features (M>1). In the example of FIG. 3, the nonlinear filter 300 is shown to include M feature extractors 310(1)-310(M), M GMMs 320(1)-320(M), and a noise suppressor 330. Each of the feature extractors 310(1)-310(M) is configured to compute a respective VAD feature $e_i(l,k)$, where i ∈ {1, . . . , M}, based on the speech signal Z(l,k), the noise signal N(l,k), or any combination thereof.

In some implementations, at least one of the feature extractors 310(1)-310(M) may compute a normalized difference between the speech signal Z(l,k) and the noise signal N(l,k). For example, a first VAD feature ($e_1$(l,k)) may be calculated according to Equation 3. Although each of the feature extractors 310(1)-310(M) is shown to receive the speech signal Z(l,k) and the noise signal N(l,k), some feature extractors may calculate a respective VAD feature $e_i$(l,k) based on the speech signal Z(l,k) alone. For example, one or more of the VAD features $e_i$(l,k) may be computed based on a power spectrum $\varphi_{ZZ}$ (l,k) of the speech signal Z(l,k):

$$\varphi_{ZZ}(l,k)=\beta\varphi_{NN}(l,k)+(1-\beta)|Z(l,k)|^2$$

where β is a smoothing factor (between 0 and 1) and $\varphi_{NN}$(l,k) is a noise power spectrum, which can be estimated by averaging the power spectrum $\varphi_{ZZ}$ (l,k) during pauses in speech (such as when speech is not detected in the speech signal Z(l,k)).

In some implementations, at least one of the feature extractors 310(1)-310(M) may compute a cepstral peak associated with the speech signal Z(l,k). For example, a second VAD feature ($e_2$(l,k)) may be computed as:

$$e_2(l,k)=\max_{\tau}\left\{\sum_{k=0}^{K-1}\log(\varphi_{ZZ}(l,k))\cos\left(\frac{\tau(k+0.5)\pi}{K}\right)\right\}$$

where τ represents a lag associated with the $n^{th}$ sample of the $l^{th}$ frame and K is the total number of frequency bins associated with the speech signal Z(l,k).

In some implementations, at least one of the feature extractors 310(1)-310(M) may compute a spectral entropy associated with the speech signal Z(l,k). For example, a third VAD feature ($e_3$(l,k)) may be computed as:

$$e_3(l,k)=-\sum_{k=0}^{K-1}\varphi_{ZZ}(l,k)\log(\varphi_{ZZ}(l,k))$$

where K is the total number of frequency bins associated with the speech signal Z(l,k).

In some implementations, at least one of the feature extractors 310(1)-310(M) may compute a harmonic product spectrum (HPS) associated with the speech signal Z(l,k). For example, a fourth VAD feature ($e_4$(l,k)) may be computed as:

$$e_4(l,k)=\max_{\tau}\left\{\sum_{r=1}^{R}\log(\varphi_{ZZ}(l,rk))\cos\left(\frac{\tau(k+0.5)\pi}{K}\right)\right\}$$

where R is a number of harmonic components corresponding to k, τ represents a lag associated with the $n^{th}$ sample of the $l^{th}$ frame, and K is the total number of frequency bins associated with the speech signal Z(l,k).

Each of the GMMs 320(1)-320(M) is configured to determine a probability of speech $$p^i_{GMM}(l,k),$$

associated with the speech signal Z(l,k), based on a respective VAD feature $e_i$(l,k). For example, each of the VAD features $e_i$(l,k) may be used to create a respective bimodal model with two Gaussian PDFs, including a Gaussian PDF for which the target speech is dominant and a Gaussian PDF for which the noise is dominant. In some implementations, each of the GMMs 320(1)-320(M) may compute the respective probability of speech $$p^i_{GMM}(l,k)$$

based on a weight $w_c$, mean $\mu_c$, and variance $\sigma_c$ of each Gaussian PDF associated with the corresponding VAD feature $e_i$(l,k) (such as described with reference to FIG. 2). For example, each probability of speech $$p^i_{GMM}(l,k),$$

may be calculated according to Equation 4.

The noise suppressor 330 is configured to produce the enhanced audio frame S(l,k) based, at least in part, on the probabilities of speech $$p^1_{GMM}(l,k)-p^M_{GMM}(l,k)$$

associated with the VAD features $e_1$(l,k)-$e_M$(l,k), respectively. In some implementations, the noise suppressor 330 may select the lowest probability of speech ($p_{GMM}$(l,k)) among the probabilities of speech $$p^1_{GMM}(l,k)-p^M_{GMM}(l,k),$$

where $$p_{GMM}(l,k)=\min\{p^i_{GMM}(l,k)\},$$

and compute a spectral suppression gain $G_{GMM}$(l,k) based on the lowest probability of speech $p_{GMM}$(l,k). For example, the noise suppressor 330 may use the probability of speech $p_{GMM}$(l,k) to calculate the magnitude (or power) of noise $p_n$(l,k) in the speech signal Z(l,k), according to Equation 5, and may calculate the spectral suppression gain $G_{GMM}$(l,k) based on the magnitude (or power) of noise $p_n$(l,k), according to Equation 6. The noise suppressor 330 may further apply the spectral suppression gain $G_{GMM}$(l,k) to the speech signal Z(l,k) to produce the enhanced audio frame $\overline{S}$(l,k), where S(l,k)=$G_{GMM}$(l,k) Z(l,k).

Figure 4:
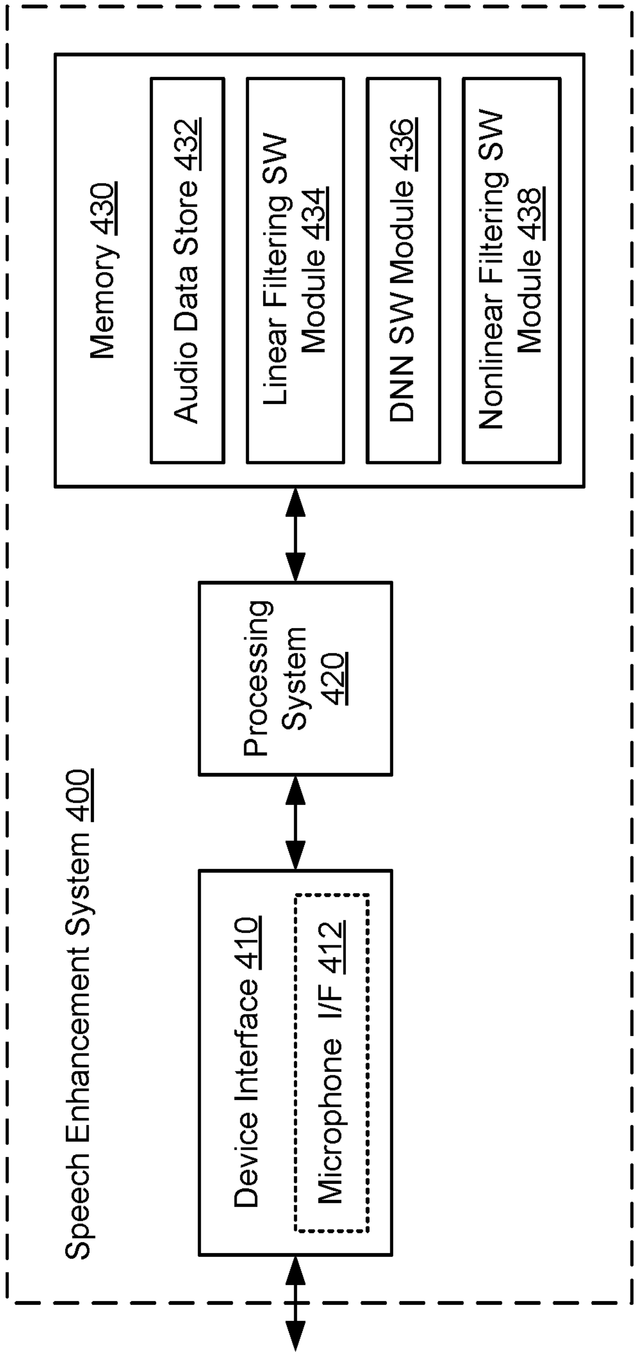
FIG. 4 shows another block diagram of an example speech enhancement system, according to some implementations.

FIG. 4 shows another block diagram of an example speech enhancement system 400, according to some implementations. More specifically, the speech enhancement system 400 may be configured to receive a single-channel audio signal and produce an enhanced audio signal by filtering or suppressing noise in the received audio signal. In some implementations, the speech enhancement system 400 may be one example of the speech enhancement component 120 of FIG. 1. The speech enhancement system 400 includes a device interface 410, a processing system 420, and a memory 430.

The device interface 410 is configured to communicate with one or more components of an audio receiver (such as the microphone 110 of FIG. 1). In some implementations, the device interface 410 may include a microphone interface (I/F) 412 configured to receive a single-channel audio signal via a microphone. In some implementations, the microphone interface 412 may sample or receive individual frames of the audio signal at a frame hop associated with the speech enhancement system 400. For example, the frame hop may represent a frequency at which an application requires or otherwise expects to receive enhanced audio frames from the speech enhancement system 400.

The memory 430 may include an audio data store 432 configured to store a series of frames of the audio signal as well as any intermediate signals that may be produced by the speech enhancement system 400 as a result of performing the speech enhancement operation. The memory 430 also may include a non-transitory computer-readable medium (including one or more nonvolatile memory elements, such as EPROM, EEPROM, Flash memory, or a hard drive, among other examples) that may store at least the following software (SW) modules:

- a linear filtering SW module 434 to denoise a first frame in the series of frames based at least in part on a temporal correlation between the series of frames;
- a DNN SW module 436 to infer a probability of speech associated with the denoised first frame based on a neural network model and to generate a speech signal and a noise signal based on the probability of speech associated with the denoised first frame, where the speech signal and the noise signal represent a speech component and a noise component, respectively, of the audio signal in the first frame; and
- a nonlinear filtering SW module 438 to determine a spectral suppression gain based on the speech signal and the noise signal and suppress residual noise in the speech signal based on the spectral suppression gain.

Each software module includes instructions that, when executed by the processing system 420, causes the speech enhancement system 400 to perform the corresponding functions.

The processing system 420 may include any suitable one or more processors capable of executing scripts or instructions of one or more software programs stored in the speech enhancement system 400 (such as in the memory 430). For example, the processing system 420 may execute the linear filtering SW module 434 to denoise a first frame in the series of frames based at least in part on a temporal correlation between the series of frames. The processing system 420 also may execute the DNN SW module 436 to infer a probability of speech associated with the denoised first frame based on a neural network model and to generate a speech signal and a noise signal based on the probability of speech associated with the denoised first frame, where the speech signal and the noise signal represent a speech component and a noise component, respectively, of the audio signal in the first frame. Further, the processing system 420 may execute the nonlinear filtering SW module 438 to determine a spectral suppression gain based on the speech signal and the noise signal and suppress residual noise in the speech signal based on the spectral suppression gain.

Figure 5:
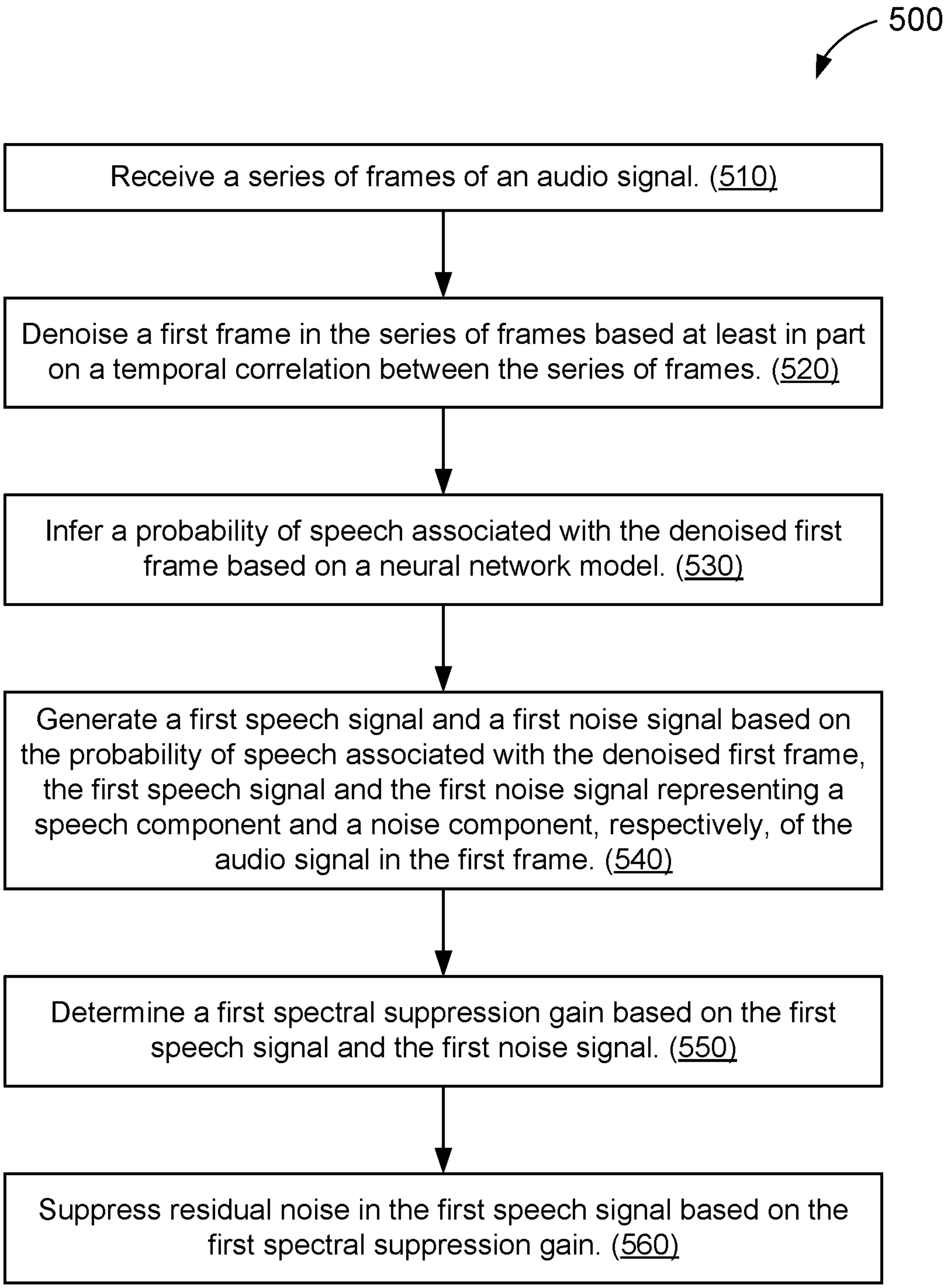
FIG. 5 shows an illustrative flowchart depicting an example operation for processing audio signals, according to some implementations.

FIG. 5 shows an illustrative flowchart depicting an example operation 500 for processing audio signals, according to some implementations. In some implementations, the example operation 500 may be performed by a speech enhancement system such as the speech enhancement component 120 of FIG. 1 or the speech enhancement system 200 of FIG. 2.

The speech enhancement system receives a series of frames of an audio signal (510). In some aspects, the audio signal may represent a single channel of audio data. The speech enhancement system denoises a first frame in the series of frames based at least in part on a temporal correlation between the series of frames (520). In some implementations, the first frame may be denoised based on an MF-MVDR beamformer that reduces a power of the noise component of the audio signal without distorting the speech component.

The speech enhancement system infers a probability of speech associated with the denoised first frame based on a neural network model (530). The speech enhancement system further generates a first speech signal and a first noise signal based on the probability of speech associated with the denoised first frame, where the first speech signal and the first noise signal represent a speech component and a noise component, respectively, of the audio signal in the first frame (540). In some implementations, the speech component of the audio signal in the denoised first frame may be equal to the speech component of the audio signal in the first speech signal.

The speech enhancement system determines a first spectral suppression gain based on the first speech signal and the first noise signal (550). In some implementations, the determining of the first spectral suppression gain may include determining a number (M) of VAD features that are indicative of whether speech is present in the first frame based at least in part on the first speech signal and the first noise signal; determining M probabilities of speech associated with the first speech signal based on the M VAD features, respectively; and determining a magnitude or power of the residual noise in the first speech signal based on the M probabilities of speech associated with the first speech signal. The speech enhancement system further suppresses residual noise in the first speech signal based on the first spectral suppression gain (560).

In some implementations, the number of VAD features may be greater than 1(M>1). In some implementations, the magnitude or power of the residual noise in the first speech signal may be determined based only on the lowest probability of speech among the M probabilities of speech associated with the first speech signal. In some implementations, each of the M probabilities of speech associated with the first speech signal is determined based on a respective GMM. In some implementations, the M VAD features may include a normalized difference between the first speech signal and the first noise signal. In some implementations, the M VAD features may include at least one of a cepstral peak, a spectral entropy, or a harmonic product spectrum (HPS) associated with the first speech signal.

In some aspects, the speech enhancement system may further determine an IFC vector associated with a speech component of the audio signal based at least in part on the probability of speech associated with the denoised first frame; denoise a second frame in the series of frames based at least in part on the IFC vector; infer a probability of speech associated with the denoised second frame based on the neural network model; generate a second speech signal and a second noise signal based on the probability of speech associated with the denoised second frame, where the second speech signal and the second noise signal represent a speech component and a noise component, respectively, of the audio signal in the second frame; determine a second spectral suppression gain based on the second speech signal and the second noise signal; and suppress residual noise in the second speech signal based on the second spectral suppression gain.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, comprising:

receiving a series of frames of an audio signal;

denoising a first frame in the series of frames based at least in part on a temporal correlation between the series of frames;

inferring a probability of speech associated with the denoised first frame based on a neural network model;

generating a first speech signal and a first noise signal based on the probability of speech associated with the denoised first frame, the first speech signal and the first noise signal representing a speech component and a noise component, respectively, of the audio signal in the first frame;

determining a first spectral suppression gain based on the first speech signal and the first noise signal; and suppressing residual noise in the first speech signal based on the first spectral suppression gain.

2. The method of claim 1, wherein the audio signal comprises a single channel of audio data.

3. The method of claim 1, wherein the first frame is denoised based on a multi-frame minimum variance distortionless response (MF-MVDR) beamformer that reduces a power of the noise component of the audio signal without distorting the speech component.

4. The method of claim 1, further comprising:

determining an interframe correlation (IFC) vector associated with a speech component of the audio signal based at least in part on the probability of speech associated with the denoised first frame;

denoising a second frame in the series of frames based at least in part on the IFC vector;

inferring a probability of speech associated with the denoised second frame based on the neural network model;

generating a second speech signal and a second noise signal based on the probability of speech associated with the denoised second frame, the second speech signal and the second noise signal representing a speech component and a noise component, respectively, of the audio signal in the second frame;

determining a second spectral suppression gain based on the second speech signal and the second noise signal; and suppressing residual noise in the second speech signal based on the second spectral suppression gain.

5. The method of claim 1, wherein the speech component of the audio signal in the denoised first frame is equal to the speech component of the audio signal in the first speech signal.

6. The method of claim 1, wherein the determining of the first spectral suppression gain comprises:

determining a number (M) of voice activity detection (VAD) features that are indicative of whether speech is present in the first frame based at least in part on the first speech signal and the first noise signal;

determining M probabilities of speech associated with the first speech signal based on the M VAD features, respectively; and determining a magnitude or power of the residual noise in the first speech signal based on the M probabilities of speech associated with the first speech signal.

7. The method of claim 6, wherein the magnitude or power of the residual noise in the first speech signal is determined based only on the lowest probability of speech among the M probabilities of speech associated with the first speech signal.

8. The method of claim 6, wherein each of the M probabilities of speech associated with the first speech signal is determined based on a respective Gaussian mixture model (GMM).

9. The method of claim 6, wherein $M>1$.

10. The method of claim 6, wherein the M VAD features include a normalized difference between the first speech signal and the first noise signal.

11. The method of claim 6, wherein the M VAD features include at least one of a cepstral peak, a spectral entropy, or a harmonic product spectrum (HPS) associated with the first speech signal.

12. A speech enhancement system comprising:

a processing system; and a memory storing instructions that, when executed by the processing system, causes the speech enhancement system to:

receive a series of frames of an audio signal;

denoise a first frame in the series of frames based at least in part on a temporal correlation between the series of frames;

infer a probability of speech associated with the denoised first frame based on a neural network model;

generate a first speech signal and a first noise signal based on the probability of speech associated with the denoised first frame, the first speech signal and the first noise signal representing a speech component and a noise component, respectively, of the audio signal in the first frame;

determine a first spectral suppression gain based on the first speech signal and the first noise signal; and suppress residual noise in the first speech signal based on the first spectral suppression gain.

13. The speech enhancement system of claim 12, wherein the audio signal comprises a single channel of audio data.

14. The speech enhancement system of claim 12, wherein the first frame is denoised based on a multi-frame minimum variance distortionless response (MF-MVDR) beamformer that reduces a power of the noise component of the audio signal without distorting the speech component.

15. The speech enhancement system of claim 12, wherein execution of the instructions further causes the speech enhancement system to:

determine an interframe correlation (IFC) vector associated with a speech component of the audio signal based at least in part on the probability of speech associated with the denoised first frame;

denoise a second frame in the series of frames based at least in part on the IFC vector;

infer a probability of speech associated with the denoised second frame based on the neural network model;

generate a second speech signal and a second noise signal based on the probability of speech associated with the denoised second frame, the second speech signal and the second noise signal representing a speech component and a noise component, respectively, of the audio signal in the second frame;

determine a second spectral suppression gain based on the second speech signal and the second noise signal; and suppress residual noise in the second speech signal based on the second spectral suppression gain.

16. The speech enhancement system of claim 12, wherein the speech component of the audio signal in denoised first frame is equal to the speech component of the audio signal in the first speech signal.

17. The speech enhancement system of claim 12, wherein the determining of the first spectral suppression gain comprises:

determining a number (M) of voice activity detection (VAD) features that are indicative of whether speech is present in the first frame based at least in part on the first speech signal and the first noise signal;

determining M probabilities of speech associated with the first speech signal based on the M VAD features, respectively; and determining a magnitude or power of the residual noise in the first speech signal based on the M probabilities of speech associated with the first speech signal.

18. The speech enhancement system of claim 17, wherein each of the M probabilities of speech associated with the first speech signal is determined based on a respective Gaussian mixture model (GMM).

19. The speech enhancement system of claim 17, wherein $M>1$.

20. The speech enhancement system of claim 17, wherein the M VAD features include at least one of a normalized difference between the first speech signal and the first noise signal, a cepstral peak of the first speech signal, a spectral entropy of the first speech signal, or a harmonic product spectrum (HPS) associated with the first speech signal.

* * * * *